Patented July 15, 1941

2,249,136

UNITED STATES PATENT OFFICE 2,249,136

ELECTRIC CONTACTING ELEMENT

Franz R. Hensel, Indianapolis, Ind., assignor to P. R. Mallory & Co., Inc., Indianapolis, Ind., a corporation of Delaware No Drawing. Original application June 28, 1937, Serial No. 150,756. Divided and this application January 16, 1940, Serial No. 314,052

1 Claim. (Cl. 200—166)

This invention relates to electric contacting elements of the type including contactor contacts and pressure exerting welding electrodes.

This application is a division of prior-filed copending application Serial No. 150,756, filed June 28, 1937.

An object of the invention is to improve the strength, hardness and temperature-resistant properties of contacting elements of the type disclosed.

Further objects are to prevent oxidation of the elements both during and after formation thereof.

A specific object is to produce a contacting element such as a welding electrode or a contact where certain desired electrical and heat conductivity coupled with high strength is required in a non-ferrous material.

Other objects of the invention will be apparent from the following description taken in connection with the appended claim.

The present invention comprises the combination of elements, methods of manufacture, and the product thereof brought out and exemplified in the disclosure hereinafter set forth, the scope of the invention being indicated in the appended claim.

The invention contemplates the provision of a contacting element of copper, chromium, silicon and cadmium. This alloy has a number of desirable properties which render it suitable for certain specified uses where high strength, a certain desired electrical and heat conductivity, high resistance to corrosion, high hardness, or high arc snuffing ability may be required.

The completed copper-chromium-silicon-cadmium alloy, to have the most desirable characteristics, should contain the component ingredients in the following ranges of proportions:

|  | Per cent |
|---|---|
| Cadmium | 0.1 to 3.0 |
| Chromium | 0.1 to 2.5 |
| Silicon | 0.05 to 5.0 |
| Copper | Balance |

The following four specific compositions are listed as examples of the above composition, the properties varying somewhat depending upon the specific proportions of ingredients used. It will be apparent that for any specific application the compositions can be chosen so as to provide the most suitable properties for the purposes:

|  |  | Per cent |
|---|---|---|
| A. | Chromium | 0.5 |
|  | Cadmium | 1.25 |
|  | Silicon | 1.00 |
|  | Copper | Balance |
| B. | Chromium | 0.5 |
|  | Cadmium | 1.00 |
|  | Silicon | 0.15 |
|  | Copper | Balance |
| C. | Chromium | 0.5 |
|  | Cadmium | 1.00 |
|  | Silicon | 0.25 |
|  | Copper | Balance |
| D. | Chromium | 0.50 |
|  | Cadmium | 1.25 |
|  | Silicon | 2.5 |
|  | Copper | Balance |

I have found that the characteristics of my alloy are not changed materially if small quantities of such elements are added, as silver, magnesium, calcium, zinc, aluminum, titanium, zirconium, tin, manganese and a metal of the iron group, such as iron, cobalt or nickel. In some uses, the addition of silver up to 1% will materially improve the alloy.

In producing the alloy of the present invention, part of the cadmium, chromium and silicon is ordinarily lost through oxidation and volatilization during melting, pouring and other handling. It is necessary, therefore, to introduce an excess of these elements into the melt in order that the finished alloy will have the composition given above.

The additives may be introduced into the copper in a variety of ways, care being taken to avoid unnecessary oxidation and volatilization of oxidizable ingredients. According to one method a copper-cadmium alloy is first made by usual alloying methods. The chromium and silicon may then be added in finely divided form, preferably combined with copper powder in the form of a briquette, and intimately mixed therewith. The chromium and silicon may also be added combined with copper to form a hardener alloy containing 10 to 25% of these ingredients. This hardener may be prepared by melting together copper, chromium and silicon under a protective atmosphere. The cadmium is preferably added to the melt before the chromium in order to avoid chromium losses.

In many cases it will be found preferable to make a master alloy having relatively high percentages of chromium, cadmium, silicon, alloyed with copper. This alloy may then be diluted with copper to form lower percentage alloys.

The cadmium used in producing the present alloy is utilized in two ways. Part of it is used up as a deoxidizer and part of it remains as an ingredient in the finished alloy. In order to have 1% cadmium in the finished alloy, for example, it is necessary to introduce about 1.20% cadmium into the original melt. About half of the excess cadmium is consumed as a deoxidizer, the cadmium being converted to cadmium oxide and separating as a slag. The rest of the excess is volatilized due to the low boiling point of the cadmium.

Some of the chromium and silicon are likewise oxidized during the alloying process and accumulates on the top of the melt as part of the slag. In order to obtain 0.5% chromium in the finished alloy it is necessary to add approximately 1.0% chromium to the melt.

In the further treatment of the alloy after solidification it may be first heated to a temperature of 600° C. to 1050° C. and preferably above 700° C. for a short time, such as from 10 to 30 minutes. After the metal has reached the desired temperature, it may be cooled quickly from the high temperature (quenched). The next step is preferably to heat treat the quenched alloy at a temperature of 350° C. to 600° C. for a period of time from 10 minutes to 30 hours, depending on the temperature, the percentage of hardener used, and the results desired.

The alloy may then be cold worked to obtain a cold reduction of approximately 20% and further cold reduction, up to 50% or more, may be applied to further increase the hardness. It has been found that the conductivity will not be appreciably decreased by these further reductions.

For maximum hardness and conductivity, however, it is preferable to apply a series of cold reductions alternated with relatively low temperature heat treatment, preferably within the range 400° C. to 500° C. The number of cold workings with intermediate heat treatments may vary with the properties desired in the finished product.

Instead of cold working the alloys they may be hot forged according to usual methods and it will be found that the resulting hot-forged product will also have a hardness greater than the alloys of the prior art.

The finished alloy has marked heat-resistant properties whereby it is able to maintain its hardness at temperatures of 400° C. to 475° C. or higher. Thus, where the alloy has been age-hardened it will be suitable for applications where a combination of high hardness, strength and heat resistance are required.

The alloy is highly fluid in the liquid state and may be readily cast.

Since the cadmium acts as a strong deoxidizer it is not necessary to add other deoxidizers commonly used, such as aluminum or magnesium, for this purpose.

The presence of the cadmium likewise tends to prevent excessive surface oxidation in the finished, solidified alloy and is particularly advantageous where they are heated to high temperatures. The surface oxidation in copper-chromium-silicon alloys is quite serious since the oxygen penetrates along the grain boundaries and tends to make the alloy brittle. In the alloy the chromium and silicon are protected by the cadmium, which will oxidize in preference to these elements.

The contacting elements have improved arc-snuffing properties, due to the presence of the cadmium.

This alloy is characterized by small grain size. Copper-chromium-silicon materials must be heated to above 900° C. before quenching in water. That elevated temperature, however, is normally very conducive to grain growth, the size of the grains usually depending on the length of time the material is held at the elevated temperature. With the alloy containing cadmium the grain size appears to be considerably reduced from that found in other copper-chromium-silicon alloys.

The alloy can be cast in chill molds or sand cast with ease and with low cadmium content can be mechanically worked in the hot or cold state with the same ease. It is likewise well adapted to machining.

The hardness and electrical conductivity of the finished material will vary considerably with the proportions of the ingredients used. In general the alloys having the higher proportions of silicon will be higher in strength and hardness but lower in electrical conductivity.

While the present invention, as to its objects and advantages, has been described herein, as carried out in specific embodiments thereof, it is not desired to be limited thereby, but it is intended to cover the invention broadly within the spirit and scope of the appended claim.

What is claimed is:

An electric contacting element of the type comprising contactor contacts and pressure exerting electrodes, said element being composed of 0.1 to 3.0% cadmium, 0.1 to 2.5% chromium, 0.05 to 5.0% silicon and the balance substantially all copper.

FRANZ R. HENSEL.